(12) United States Patent
Li et al.

(10) Patent No.: US 11,396,948 B2
(45) Date of Patent: Jul. 26, 2022

(54) VALVE

(71) Applicant: ILLINOIS TOOL WORKS INC., Glenview, IL (US)

(72) Inventors: Jionghua Li, Shanghai (CN); Yuhang Zeng, Shanghai (CN); Yue Ma, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/174,561

(22) Filed: Feb. 12, 2021

(65) Prior Publication Data

US 2021/0254726 A1 Aug. 19, 2021

(30) Foreign Application Priority Data

Feb. 19, 2020 (CN) .......................... 202010103318.8
Jan. 28, 2021 (CN) .......................... 202110118585.7

(51) Int. Cl.
*F16K 5/06* (2006.01)
*F16C 41/00* (2006.01)
*B60K 11/02* (2006.01)

(52) U.S. Cl.
CPC ................ *F16K 5/06* (2013.01); *F16C 41/00* (2013.01); *B60K 11/02* (2013.01); *F16C 2361/91* (2013.01)

(58) Field of Classification Search
CPC ........ F16K 5/06; F16K 5/0626; F16K 5/0642; F16K 5/0636; F16K 11/087; F16K 11/0873; F16K 11/0876; F16K 11/22; F16K 11/24; F01P 2007/146; F16C 2361/91; F16C 43/02
See application file for complete search history.

(56) References Cited

U.S. PATENT DOCUMENTS

| | | | |
|---|---|---|---|
| 9,052,046 B2 * | 6/2015 | Habermann | F16L 37/098 |
| 9,366,344 B2 * | 6/2016 | Rogge | F16K 5/0647 |
| 10,731,625 B1 * | 8/2020 | Harshman | F03C 1/0671 |
| 2015/0075453 A1 * | 3/2015 | Oikawa | F01P 7/14 |
| | | | 123/41.1 |
| 2018/0313457 A1 * | 11/2018 | Shen | F16K 27/065 |
| 2020/0224779 A1 * | 7/2020 | Henker | F16K 31/535 |
| 2020/0256478 A1 * | 8/2020 | Schmitt | F16K 37/0008 |
| 2020/0271043 A1 * | 8/2020 | Murray | F01P 5/10 |
| 2021/0164579 A1 * | 6/2021 | Karve | F16K 27/003 |

* cited by examiner

*Primary Examiner* — Hailey K. Do
(74) *Attorney, Agent, or Firm* — Quarles & Brady LLP

(57) ABSTRACT

A valve, comprising: a housing, a holder, a first valve body, a bearing, and a second valve body. The housing comprises a first housing part, a second housing part, and a neck connecting the first housing part and the second housing part, a first valve body cavity is formed in the first housing part. The holder is provided in the second housing part, the holder and the second housing part together form a second valve body cavity and a pump cavity, the holder and the neck together form a bearing accommodating part for enabling the first valve body cavity to be in fluid communication with the pump cavity. At the bearing accommodating part defined by the holder and the neck, a limiter is provided, the limiter extends towards the bearing, the bearing has a receiving part, and the limiter cooperates with the receiving part to restrict movement of the bearing.

10 Claims, 4 Drawing Sheets

/ VALVE

CROSS REFERENCES TO RELATED APPLICATIONS

This application claims the benefit of Chinese Patent Application No. 202010103318.8, filed on Feb. 19, 2020, and Chinese Patent Application No. 202110118585.7, filed on Jan. 28, 2021, both of which are incorporated herein by reference in their entirety.

TECHNICAL FIELD

The present disclosure relates to the field of valves, and more specifically to a valve for a cooling system of an internal combustion engine.

BACKGROUND

Valves (or referred to as multi-channel valves, temperature regulating valves, thermostatic valves, regulating valves, etc.) are typically used in a cooling system of an internal combustion engine. The valves can be controlled to be in communication with different cooling liquid channels to control a flow path and a flow rate of a cooling liquid, so as to adjust the temperature of the internal combustion engine. The valve generally comprises a housing and a valve body, and the valve body is supported by a bearing or a holder. The bearing is generally mounted in the housing by means of an interference fit with the housing.

SUMMARY OF THE DISCLOSURE

The present disclosure provides a valve, comprising: a housing, a holder, a first valve body, a bearing, and a second valve body. The housing comprises a first housing part, a second housing part and a neck, the neck connecting the first housing part and the second housing part, and a first valve body cavity being formed in the first housing part. The holder is provided in the second housing part, the holder and the second housing part together form a second valve body cavity and a pump cavity, and the holder and the neck together form a bearing accommodating part, and the bearing accommodating part enables the first valve body cavity to be in fluid communication with the pump cavity. The first valve body is rotatably disposed in the first valve body cavity. The bearing is accommodated in the bearing accommodating part, and the bearing is configured to support a shaft of the first valve body. The second valve body is rotatably disposed in the second valve body cavity, and a shaft of the second valve body is supported by the holder. At the bearing accommodating part defined by the holder and the neck, a limiter is provided, the limiter extends towards the bearing, the bearing has a receiving part, and the limiter cooperates with the receiving part to restrict movement of the bearing relative to the bearing accommodating part.

According to the valve of the present disclosure, the holder comprises a base and a wall part connected to the base, the base, an inner side of the wall part and the second housing part together form the second valve body cavity, an outer side of the wall part and the second housing part together form the pump cavity, and the outer side of the wall part and the neck together form the bearing accommodating part.

According to the valve of the present disclosure, the bearing accommodating part is provided with a circular inner surface, the outer side of the wall part of the holder is provided with an arc surface, the arc surface and an inner surface of the neck together form the circular inner surface of the bearing accommodating part, and the limiter extends out of the arc surface.

According to the valve of the present disclosure, a diameter of the circular inner surface matches with an outer diameter of the bearing.

According to the valve of the present disclosure, the limiter is a boss, the receiving part is a recess formed on the bearing, and the boss is inserted in the recess.

According to the valve of the present disclosure, the boss is in contact with a recess bottom of the recess.

According to the valve of the present disclosure, the limiter extends perpendicular to the shaft of the first valve body towards the bearing.

According to the valve of the present disclosure, a distance that the limiter extends in a circumferential direction of the bearing accommodating part is less than a distance that the receiving part extends in the circumferential direction of the bearing accommodating part.

According to the valve of the present disclosure, the bearing is provided with an opening to render a fluid communication of the first valve body cavity with the pump cavity.

According to the valve of the present disclosure, the limiter and the holder are integrally formed by an injection molding process.

The structure in which the limiter cooperates with the receiving part provided in the present disclosure can effectively maintain the bearing in the housing. The valve of the present disclosure is simple to assemble, reduces the complexity of the assembly structure, and facilitates miniaturization. Various advantages of the valve of the present disclosure will be described in detail below with reference to the accompanying drawings.

BRIEF DESCRIPTION OF THE DRAWINGS

These and other features and advantages of the present disclosure may be better understood by reading the following detailed description with reference to the accompanying drawings. The same reference numerals represent the same components throughout the accompanying drawings, in which.

DETAILED DESCRIPTION OF EMBODIMENTS

Various specific embodiments of the present disclosure are described below with reference to the accompanying drawings which constitute part of this description. It should be understood that although the terms such as "front", "rear", "upper", "lower", "left", "right", "inner", "outer", "top" and "bottom" indicating directions in the present disclosure are used to describe various exemplary structural parts and elements in the present disclosure, these terms used herein are merely used for ease of description and are determined based on the exemplary orientation shown in the accompanying drawings. Since the embodiments disclosed in the present disclosure can be arranged in different directions, these terms indicating directions are only illustrative and should not be considered as limitations.

Figure 1A:
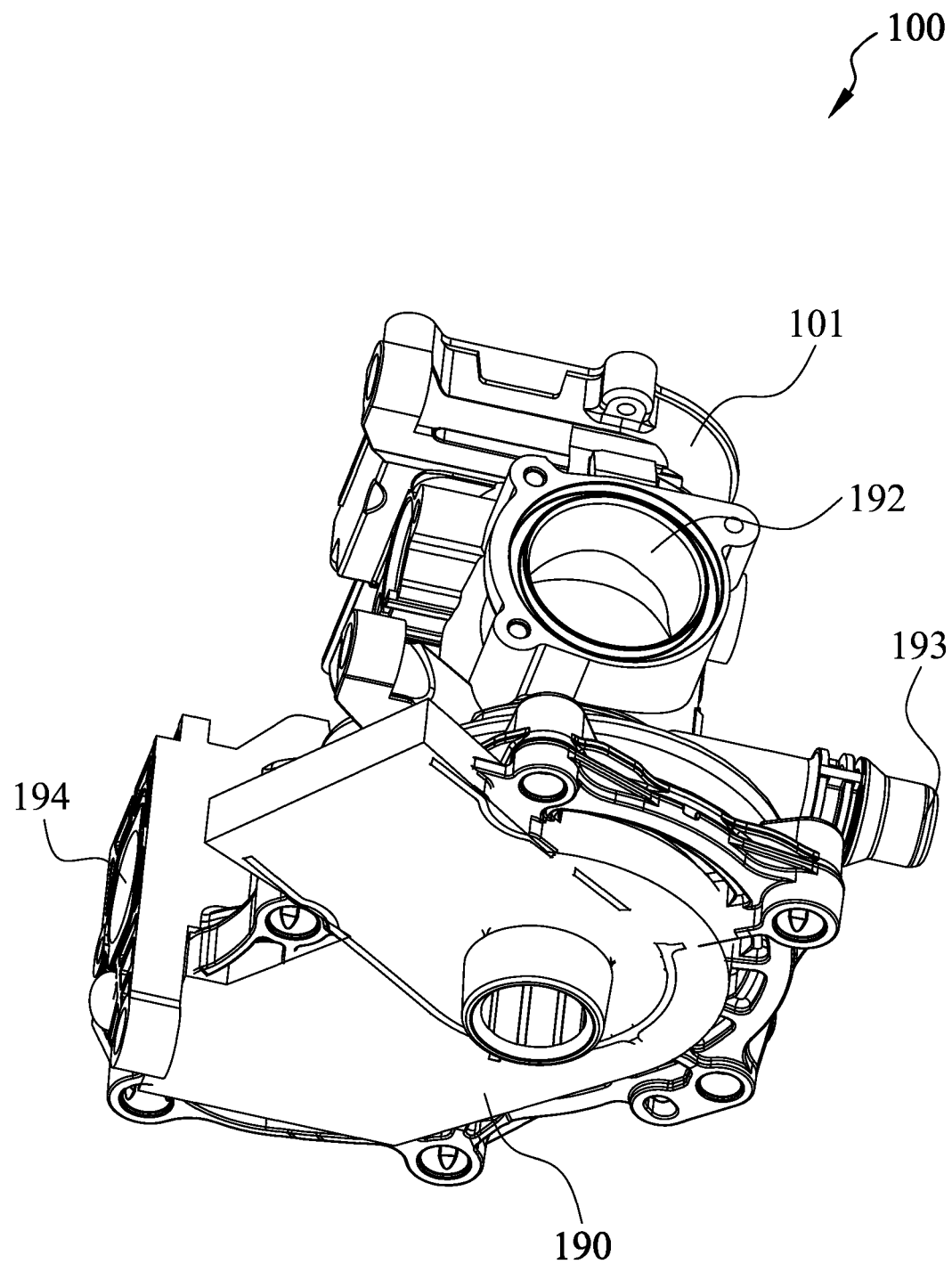
FIG. 1A is a perspective view of an embodiment of a valve of the present disclosure.
Figure 1B:
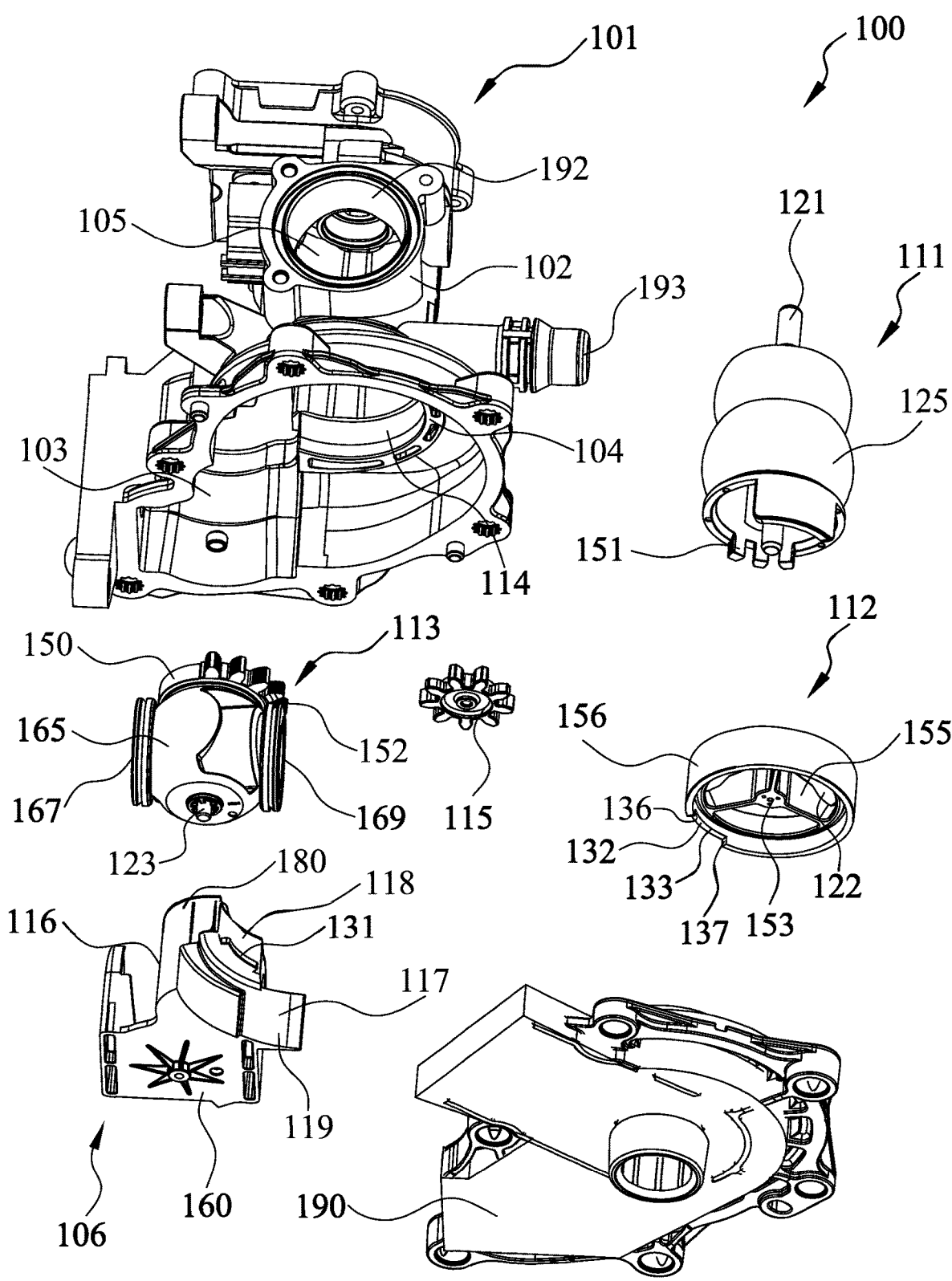
FIG. 1B is an exploded view of the valve shown in FIG. 1A.

FIG. 1A is a perspective view of an embodiment of a valve 100 of the present disclosure, and FIG. 1B is an exploded view of the valve 100 shown in FIG. 1A for showing the overall structure and specific components of the valve 100. As shown in FIG. 1B, the valve 100 comprises a housing 101, a holder 106, a first valve body 111, a bearing 112, a second valve body 113, a sealing cover assembly 190, and a gear 115. With reference to FIG. 1A, it can be seen that the first valve body 111, the bearing 112, the second valve body 113, the gear 115 and the holder 106 are accommodated inside the housing 101, and the sealing cover assembly 190 seals against the lower wall of the housing 101 to maintain the above elements in the housing 101.

As shown in FIG. 1B, the housing 101 is made of a plastic material, and comprises a first housing part 102, a second housing part 103, and a neck 104. A first valve body cavity 105 is provided in the first housing part 102, and a volume of the first valve body cavity 105 is greater than that of the first valve body 111, such that the first valve body 111 can be rotatably accommodated in the first valve body cavity 105. The first housing part 102 is provided with pipe orifices 192 and 193, and the pipe orifices 192 and 193 are tubular and are in fluid communication with the first valve body cavity 105, such that liquid can flow into the valve 100 via the pipe orifices 192 and 193.

The second housing part 103 is located below the first housing part 102, and the holder 106, the second valve body 113 and the gear 115 are accommodated in the second housing part 103 at left side thereof. A pipe orifice 194 is provided on the second housing part 103, and the pipe orifice 194 is in fluid communication with the interior of the second housing part 103, such that liquid can flow out of the valve 100 via the pipe orifice 194.

The neck 104 is located between the first housing part 102 and the second housing part 103, connects the first housing part 102 with the second housing part 103, and is used for accommodating the bearing 112. The neck 104 is provided with an arc inner surface 114, and the height and the diameter of the arc inner surface 114 respectively match with the height and the outer diameter of the bearing 112. For example, the height of the arc inner surface 114 is greater than or equal to the height of the bearing 112, the diameter of the arc inner surface 114 is equal to or slightly greater than the outer diameter of the bearing 112, such that the arc inner surface 114 can accommodate the bearing 112.

The first valve body 111 comprises a hollow main body 125 and a shaft 121 connected to the main body 125. The main body 125 comprises two coaxially disposed spherical parts. The main body part 125 can rotate around the shaft 121, such that the second valve body 111 disables or enables the pipe orifices 192/193 to be in fluid communication with the first valve body cavity 105. An upper end of the shaft 121 is inserted in a corresponding shaft hole (not shown) in the first housing part 102, and a lower end of the shaft 121 is supported by the bearing 112, such that the first valve body 111 can be rotatably maintained in the first valve body cavity 105. The first valve body 111 is provided with a plurality of teeth 151 at a lower portion thereof. The teeth 151 mesh with the gear 115, such that the gear 115 can rotate together with the first valve body 111.

The bearing 112 is made of a plastic material, and an outer contour thereof is substantially annular. The bearing 112 has an annular side wall 156, and is provided with a supporting part 153 at the center thereof. The supporting part 153 is provided with a shaft hole (not shown), and the bearing 112 cooperates with the shaft 121 of the first valve body 111 via the shaft hole to support the first valve body 111. The supporting part 153 is connected to the annular side wall 156 via three connecting walls 155, so as to form three openings 122 between the supporting part 153 and the annular side wall 156 to allow liquid to flow from the first housing part 102 into the second housing part 103. The annular side wall 156 is provided with a receiving part 132 at a lower end thereof. In this embodiment, the receiving part 132 is a recess. The recess 132 is formed by recessing upwardly from bottom surface of the annular side wall 156, and has a recess bottom 133 and inner side walls 136 and 137 on two opposite sides of the recess bottom 133. The receiving part 132 is used to cooperate with the holder 106 to restrict movement of the bearing 112 relative to the neck 104, which will be described in detail below.

Figure 4:
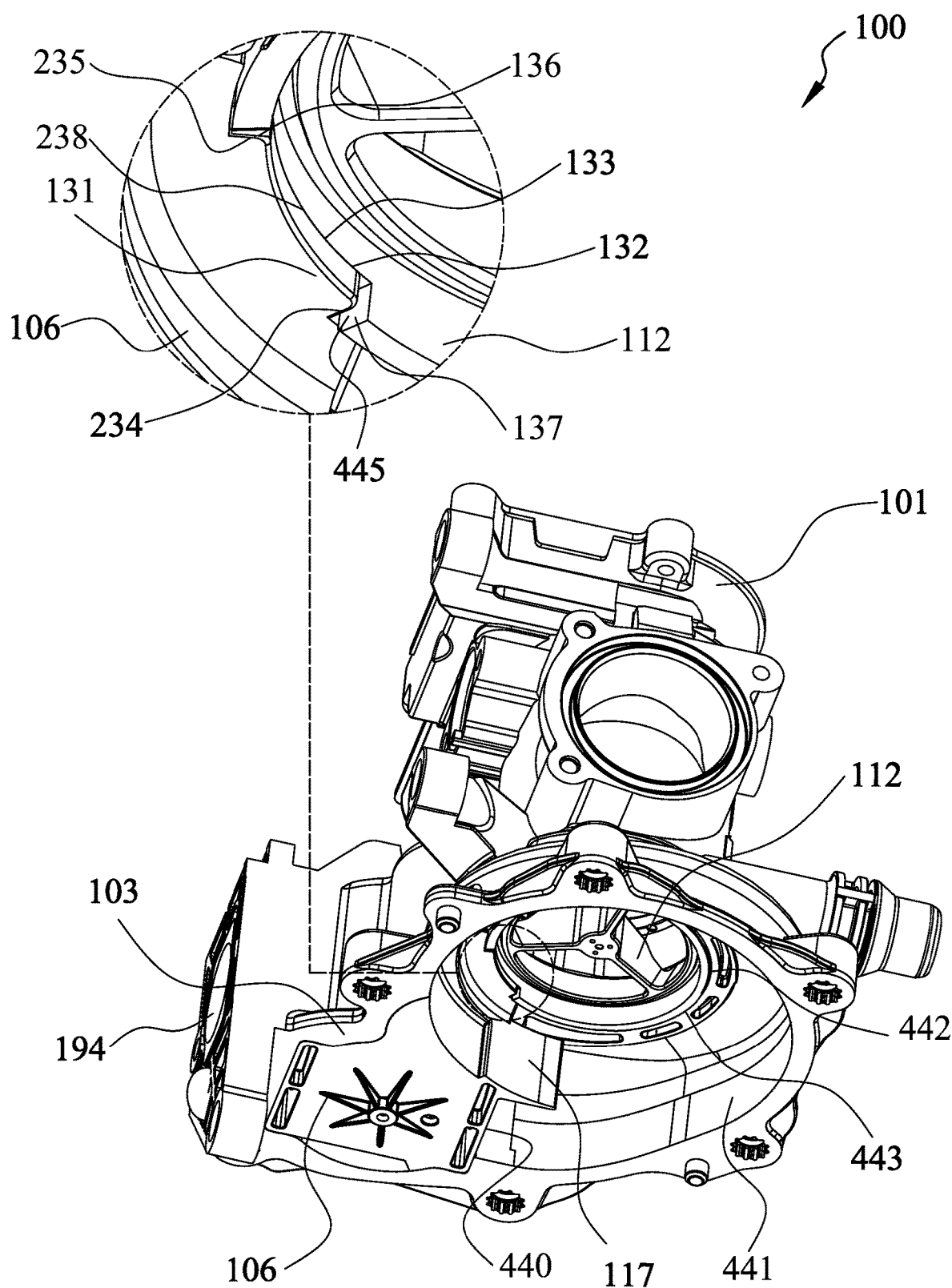
FIG. 4 is a perspective view of the valve shown in FIG. 1A with the sealing cover assembly removed.

The second valve body 113 comprises a hollow main body 165 and a shaft 123 connected to the main body 165. The main body 165 has a substantially spherical outer contour and comprises a pair of valve body openings 167 and 169 which communicate with each other through a hollow cavity within the main body 165. The main body 165 can rotate around the shaft 123, such that the second valve body 113 disables or enables the pipe orifice 194 to be in fluid communication with the interior of the second housing part 103, or adjusts the flow rate of fluid. An upper end of the shaft 123 is inserted in a shaft hole (not shown) in the second housing part 103, and a lower end thereof is supported by the holder 106, such that the second valve body 113 can be maintained in a second valve body cavity 440 formed by the holder 106 and the second housing part 103 together (as shown in FIG. 4). An upper end of the main body 165 comprises a gear 150 with a plurality of teeth 152. The teeth 152 mesh with the gear 115, such that the gear 115 can rotate with the gear 150, so as to drive the second valve body 113 to rotate, and thus the first valve body 111 can drive the second valve body 113 to rotate via the gear 115.

The holder 106 is disposed inside of the second housing part 103 and at a position close to the pipe orifice 194. The holder 106 comprises a base 160 and a wall part 180 connected to the base 160, and the second valve body 113 is accommodated in a space defined by the base 160 and an inner side 116 of the wall part 180. An outer side 117 of the wall part 180 can be engaged with the neck 104, and the outer side 117 of the wall part 180 has a limiter 131. The limiter 131 extends outwards from the outer side 117 of the wall part 180 and extends towards the bearing 112. The limiter 131 can cooperate with the receiving part 132 of the bearing 112 to restrict rotation and movement of the bearing 112 relative to the housing 101.

Figure 2:
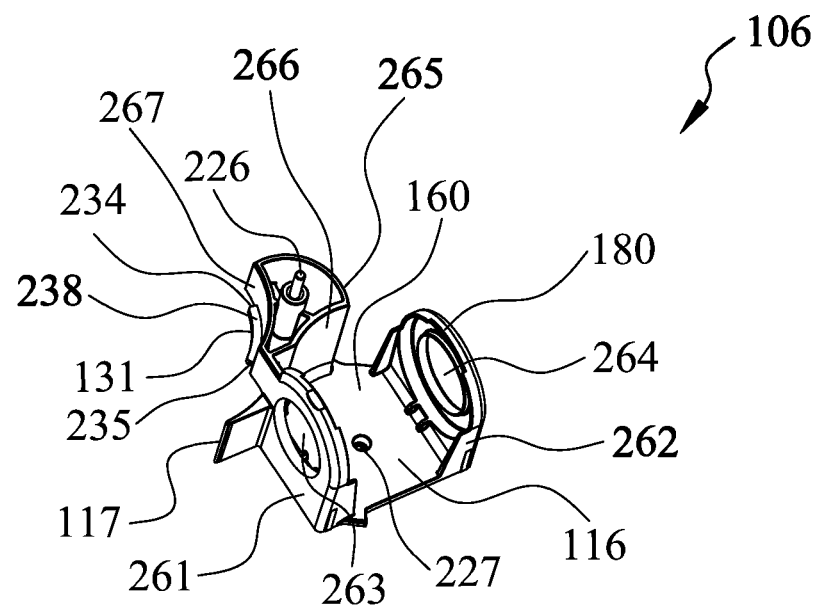
FIG. 2 is a perspective view of a holder of the valve shown in FIG. 1B as viewed from inside to outside.

FIG. 2 is a perspective view of a holder 106 of the valve 100 shown in FIG. 1B as viewed from inside to outside for showing the structure of the holder 106 more clearly. As shown in FIG. 2, the base 160 of the holder 106 is substantially square, and the base 160 is provided with a shaft hole 227 near the center of the base 160 to cooperate with the shaft 123 of the second valve body 113. The wall part 180 comprises two side walls 261 and 262 which extend upwards from opposite first and second sides of the base 160 perpendicular to the base 160. The side walls 261 and 262 are respectively provided with circular holes 263 and 264, and the circular hole 264 is aligned with and in fluid communication with the pipe orifice 194. When the second valve body 113 is in an open position, the liquid sequentially flows through the circular hole 263, the second valve body 113 and the circular hole 264, and flows out of the valve 100 via the pipe orifice 194. The wall part 180 of the holder 106 further comprises a partition wall 265, and the partition wall 265 extends upwards from a third side of the base 160 and is connected to the side wall 261. The top of the partition wall 265 is provided with a shaft 226, the gear 115 is disposed on the shaft 226, and an upper end of the shaft 226 is inserted into a shaft hole (not shown) in the second housing part 103, so as to maintain the gear 115 in the second housing part 103. An inner side 266 of the partition part 265, inner sides (i.e., the inner side 116 of the wall part 180) of the side walls 261 and 262, and the second housing part 103 together form the second valve body cavity 440 (as shown in FIG. 4) that can accommodate the second valve body 113.

An outer side 267 of the partition wall 265 is part of the outer side 117 of the wall part 180. The outer side 267 of the partition wall 265 comprises two arc surfaces 118 and 119 with different diameters (as shown in FIG. 1B). The arc surface 118 is located above the arc surface 119, and a diameter of the arc surface 118 is less than a diameter of the arc surface 119, such that the arc surface 119 is recessed inwards deeper than the arc surface 118. The diameter of the arc surface 118 is substantially equal to the diameter of the arc inner surface 114 of the neck 104. The arc surface 118 and the arc inner surface 114 are fit together to form a full circle so as to accommodate the bearing 112. The arc surface 119 is configured to be fit with an inner wall of the second housing part 103 located below the neck 104 to together form an inner wall of a pump cavity 441 (as shown in FIG. 4).

The limiter 131 is disposed at a lower end of the arc surface 118, and the limiter 131 and the holder 106 are integrally formed by an injection molding process. In this embodiment, the limiter 131 is a boss. The boss 131 is formed by protruding outwards from the outer side 267 of the partition wall 265, and the boss 131 is perpendicular to the shaft 121 of the first valve body 111 and extends towards the bearing 112 (shown in FIG. 4 more clearly). The boss 131 has an upper surface 238 and a pair of outer side walls 234 and 235 located on two opposite sides of the upper surface 238. The specific positional relationship between the boss 131 and the recess 132 will be described in detail in FIG. 4.

Figure 3:
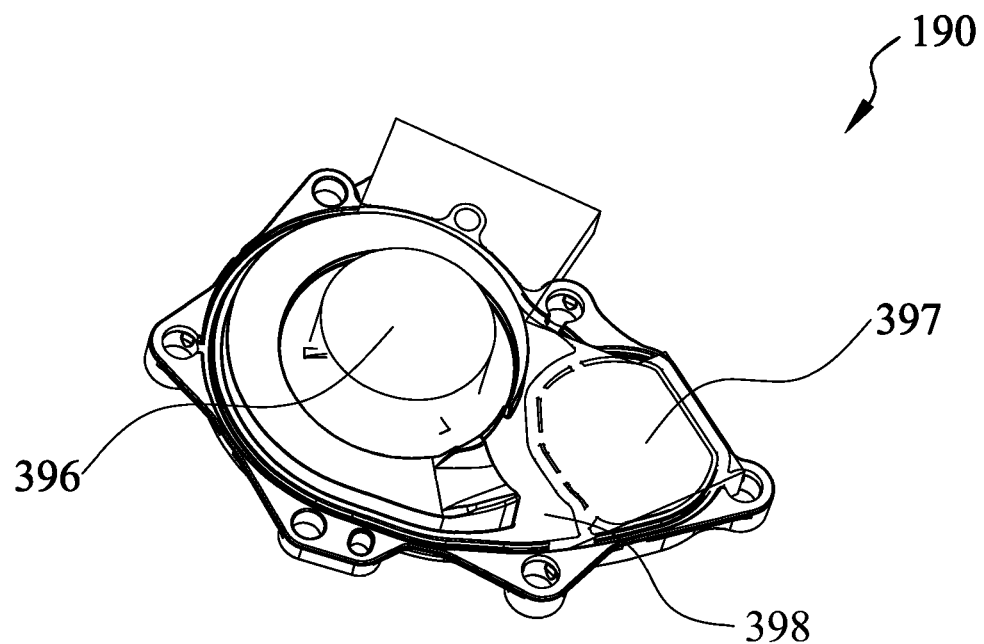
FIG. 3 is a perspective view of a sealing cover assembly of the valve shown in FIG. 1B as viewed from inside to outside.

FIG. 3 is a perspective view of a sealing cover assembly 190 as viewed from inside to outside, and is used to show the structure of the sealing cover assembly 190 more clearly. As shown in FIG. 3, the sealing cover assembly 190 comprises a sealing cover 398 and a pump 396 mounted on the sealing cover 398. The sealing cover 398 comprises a holder contact area 397 on one side of the pump 396. The holder contact area 397 is configured to abut against the base 160 of the holder 106. The pump 396 is accommodated in a pump cavity 441 (as shown in FIG. 4) formed by the outer side 117 of the wall part 180 of the holder 106 and the second housing part 103 together. An outer contour of the sealing cover 398 matches with the shape of an opening at a lower end of the second housing part 103 to seal the opening at the lower end of the second housing part 103 by means of the sealing cover 398.

FIG. 4 is a perspective view of the valve 100 shown in FIG. 1A with the sealing cover assembly 190 hidden, for showing the assembly relationship between internal components of the valve 100 more clearly. As shown in FIG. 4, with reference to FIGS. 1A, 1B and 2, the holder 106 is located in the second housing part 103 at the left side thereof, and the opening 264 at the side wall 262 of the holder 106 is aligned with the pipe orifice 194. The side wall 261 of the holder 106 and the partition wall 265 divide the internal space of the second housing part 103 into two parts. The inner side 116 of the wall part 180 of the holder 106 and a left side part of the second housing part 103 together form a second valve body cavity 440 (the cavity 440 is shielded by the base 160 of the holder 106). The outer side 267 of the partition wall 265 and the outer side of the side wall 261 of the holder 106 and a right side part of the second housing part 103 together form a pump cavity 441. The second valve body cavity 440 is in fluid communication with the pump cavity 441 through the circular hole 263 in the side wall 261 of the holder 106.

In addition, the arc surface 118 of the partition wall 265 of the holder 106 and the arc inner surface 114 of the neck 104 fit to form a circular inner surface 443. As described above, the diameter of the arc inner surface 114 of the neck 104 matches with the outer diameter of the bearing 112, and the diameter of the arc surface 118 of the holder 106 is equal to the diameter of the arc inner surface 114. Therefore, the diameter of the circular inner surface 443 also matches with the outer diameter of the bearing 112, such that the bearing accommodating part 442 defined by the outer side 117 of the holder 106 and the neck 104 can accommodate the bearing 112. The boss 131 on the partition wall 265 of the holder 106 is perpendicular to the shaft 121 of the first valve body 111 and extends towards the bearing 112, and the boss 131 cooperates with the recess 132 of the bearing 112 to restrict movement of the bearing 112 relative to the bearing accommodating part 442.

Specifically, as shown in the partial enlarged view in a circular dashed frame of FIG. 4, the upper surface 238 of the boss 131 abuts against the recess bottom 133 of the recess 132 of the bearing 112, such that the bearing 112 cannot pass over the boss 131 and escape from the bearing accommodating part 442, thereby ensuring the proper axial position of the bearing 112 during assembly. The outer side wall 235 of the boss 131 abuts against the inner side wall 136 of the recess 132, and there is a gap 445 between the outer side wall 234 of the boss 131 and the inner side wall 137 of the recess 132. That is, the distance between the two outer side walls 234 and 235 of the boss 131 (i.e., the distance that the boss 131 extends in the circumferential direction of the bearing accommodating part 442) is less than the distance between the two inner side walls 136 and 137 of the recess 132 (i.e., the distance that the recess 132 extends in the circumferential direction of the bearing accommodating part 442). The first valve body 111 applies torque to the bearing 112 during rotation, but since the outer side wall 235 of the boss 131 abuts against the inner side wall 136 of the recess 132, the bearing 112 cannot rotate relative to the bearing accommodating part 442.

It should be noted that it is very advantageous in that the distance that the boss 131 extends in the circumferential direction of the bearing accommodating part 442 is less than the distance that the recess 132 extends in the circumferential direction of the bearing accommodating part 442, such that there is the gap 445 therebetween, because the gap 445 compensates necessary dimensional tolerances during manufacturing and assembly, and the presence of the gap 445 will not have any adverse effect on the valve 100.

It should be noted that during the initial assembly, the gap 445 may be located between the outer side wall 235 of the boss 131 and the inner side wall 136 of the recess 132. Since the first valve body 111 has a determined direction of rotation, the bearing 112 tends to rotate in the direction of rotation of the first valve body 111. Under the action of the first valve body 111, since the inner side wall 136 of the recess 132 is not in contact with the outer side wall 235 of the boss 131, the bearing 112 cannot be prevented from slowly rotating with the first valve body 111, such that the inner side wall 136 of the recess 132 will gradually approach the outer side wall 235 of the boss 131, and the gap between the outer side wall 235 of the boss 131 and the inner side wall 136 of the recess 132 will gradually become smaller. Finally, when the inner side wall 136 of the recess 132 abuts against the outer side wall 235 of the boss 131, due to the blocking effect of the boss 131, the bearing 112 cannot continue to rotate and reaches a stationary state. At this time, the gap 445 is no longer located between the outer side wall 235 of the boss 131 and the inner side wall 136 of the recess 132, but located between the outer side wall 234 of the boss 131 and the inner side wall 137 of the recess 132.

Of course, those skilled in the art should appreciate that in other embodiments, the gap 445 may not exist. For example, the outer side walls 234 and 235 of the boss 131 can be respectively in contact with the corresponding inner side walls 136 and 137 on the recess 132. In addition, the height of the boss 131 does not need to strictly match with the depth of the recess 132, and may be greater than and equal to or be less than the depth of the recess 132, which will not have any adverse effect on the valve 100 and is beneficial to manufacturing.

It should be noted that although in the present disclosure the limiter 131 is a boss which extends perpendicular to the shaft 121 of the first valve body 111 towards the bearing 112, and the receiving part 132 is a recess formed on the bearing 112, those skilled in the present disclosure would understand that the limiter 131 and the receiving part 132 may have other structures or shapes, as long as the limiter 131 and the receiving part 132 can cooperate with each other to restrict movement of the bearing 112 relative to the bearing accommodating part 442. For example, the limiter 131 may be either a hook part which extends downwards and then upwards relative to the arc surface 118, or a protrusion part which extends obliquely relative to the shaft 121 of the first valve body 111; and the receiving part 132 may be an opening, on the side wall of the bearing 112, that matches with the limiter 131, such as a rectangular opening, or may be any other structure that can match with the corresponding limiter 131. In addition, the number of the limiters 131 and the receiving parts 132 is not limited to one as shown in this embodiment, and may be two, three, or even more.

The applicant has noted that the valve in the prior art restricts the bearing in the housing by means of the interference fit between the bearing and the housing. Such a structure of the valve in the prior art has very strict requirements for the manufacturing of parts, and the assembly process is complicated, which is not conducive to mass production and control. Specifically, the valve is usually made of plastic. If the magnitude of interference is too large during assembly, the bearing may be difficult to assemble, or the housing may be deformed or even cracked by the bearing; and if the magnitude of interference is too small, it is difficult to ensure that the bearing is in a tight fit with the housing after assembly and relative movement or rotation will occur. Moreover, the smaller the size of the valve, the more difficult it is to control the magnitude of interference of the bearing, which is not conducive to miniaturization of the valve. Even if the magnitude of interference is appropriate, after the valve is assembled and used for a long time, under the working conditions of high and low temperature, vibration, cooling liquid impact, etc. of a vehicle, the creep of the bearing or the housing will cause the bearing to fall off from the housing, affecting normal use of the valve.

The present disclosure effectively overcomes the above disadvantages of the prior art. Plastic parts of the present disclosure will not or rarely be squeezed, such that the present disclosure can solve the problem that the plastic parts themselves are not resistant to squeeze. In the present disclosure, the outer side 117 of the wall part 180 of the holder 106 and the neck 104 are engaged together to form a bearing accommodating part 442 to accommodate the bearing 112, the outer side 117 of the wall part 180 of the holder 106 is provided with the limiter 131, and the bearing 112 is provided with the receiving part 132 that cooperates with the limiter 131, thereby preventing the bearing 112 from rotating and escaping. According to the present disclosure, during the use, the bearing 112 will not escape from the housing 101 due to creep, because there is no or only small force between the bearing 112 and the housing 101. The present disclosure is further conducive to the miniaturization of the valve 100, because the limiter 131 and the receiving part 132 do not need to be configured to have size in proportion to the size of the bearing 112, and are less affected by the size of the bearing 112 as compared to the prior art. In addition, the valve 100 of the present disclosure allows the presence of the gap 445 between the limiter 131 and the receiving part 132, which greatly reduces the difficulty of manufacturing parts and is conducive to mass production and control of the parts. In addition, the assembly process of the valve 100 of the present disclosure is simpler than that of the prior art.

The assembly process of the valve 100 of the present disclosure is specifically as follows. With reference to FIGS. 1B and 4, the second valve body 113 is first mounted into the space defined by the base 160 of the holder 106 and the inner side 116 of the wall part 180, and the shaft 121 of the first valve body 111 is inserted into the corresponding shaft hole of the first housing part 102. Next, the recess 132 of the bearing 112 is engaged with the boss 131 of the holder 106, and the gear 115 is disposed on the shaft 226 of the holder 106. Then, the pre-assembled second valve body 113, the holder 106, the gear 115 and the bearing 112 are inserted into the housing 101 as a whole, such that the shaft hole of the bearing 112 is engaged with the shaft 121 of the first valve body 111, and the shaft 123 of the second valve body 113 and the shaft 226 of the holder 106 are respectively engaged with the corresponding shaft holes in the second housing part 103. Finally, the sealing cover assembly 190 seals the opening at the lower end of the second housing part 103 to complete the assembly of the valve 100.

Although the present disclosure will be described with reference to the specific embodiments shown in the accompanying drawings, it should be understood that the valve of the present disclosure can have many variations without departing from the spirit, scope and background taught by the present disclosure. Those of ordinary skill in the art would also have appreciated that there are different ways to alter the structural details in the embodiments disclosed in the present disclosure, which all fall within the spirit and scope of the present disclosure and the claims.

The invention claimed is:
1. A valve, comprising:
a housing, the housing comprising a first housing part, a second housing part, and a neck, the neck connecting the first housing part and the second housing part, and a first valve body cavity being formed in the first housing part;

a holder, the holder being provided in the second housing part, the holder and the second housing part together forming a second valve body cavity and a pump cavity, and the holder and the neck together forming a bearing accommodating part, wherein the bearing accommodating part enables the first valve body cavity to be in fluid communication with the pump cavity;

a first valve body, the first valve body being rotatably disposed in the first valve body cavity;

a bearing, the bearing being accommodated in the bearing accommodating part, and the bearing is configured to support a shaft of the first valve body; and a second valve body, the second valve body being rotatably disposed in the second valve body cavity, wherein a shaft of the second valve body is supported by the holder;

wherein, at the bearing accommodating part defined by the holder and the neck, a limiter is provided, the limiter extends towards the bearing, the bearing has a receiving part, and the limiter cooperates with the receiving part to restrict movement of the bearing relative to the bearing accommodating part.

2. The valve according to claim 1, wherein the limiter extends perpendicular to the shaft of the first valve body towards the bearing.

3. The valve according to claim 1, wherein a distance that the limiter extends in a circumferential direction of the bearing accommodating part is less than a distance that the receiving part extends in the circumferential direction of the bearing accommodating part.

4. The valve according to claim 1, wherein the bearing is provided with an opening to render a fluid communication of the first valve body cavity with the pump cavity.

5. The valve according to claim 1, wherein the limiter and the holder are integrally formed by an injection molding process.

6. The valve according to claim 1, wherein the limiter is a boss, the receiving part is a recess formed on the bearing, and the boss is inserted in the recess.

7. The valve according to claim 6, wherein the boss is in contact with a recess bottom of the recess.

8. The valve according to claim 1, wherein the holder comprises a base and a wall part connected to the base, the base, an inner side of the wall part and the second housing part together form the second valve body cavity, an outer side of the wall part and the second housing part together form the pump cavity, and the outer side of the wall part and the neck together form the bearing accommodating part.

9. The valve according to claim 8, wherein the bearing accommodating part is provided with a circular inner surface, the outer side of the wall part of the holder is provided with an arc surface, and the arc surface and an inner surface of the neck together form the circular inner surface of the bearing accommodating part;

wherein, the limiter extends out of the arc surface.

10. The valve according to claim 9, wherein a diameter of the circular inner surface matches with an outer diameter of the bearing.

* * * * *